US010404030B2

(12) United States Patent
Morrow et al.

(10) Patent No.: US 10,404,030 B2
(45) Date of Patent: Sep. 3, 2019

(54) FLAT-FOLDED CERAMIC SLAB LASERS

(71) Applicant: Iradion Laser, Inc., North Smithfield, RI (US)

(72) Inventors: Clifford E. Morrow, North Kingstown, RI (US); Wendelin Weingartner, Brooklyn, NY (US)

(73) Assignee: IRADION LASER, INC., Uxbridge, MA (US)

( * ) Notice: Subject to any disclaimer, the term of this patent is extended or adjusted under 35 U.S.C. 154(b) by 7 days.

(21) Appl. No.: 14/617,878

(22) Filed: Feb. 9, 2015

(65) Prior Publication Data

US 2016/0233640 A1 Aug. 11, 2016

(51) Int. Cl.

*H01S 3/081* (2006.01)
*H01S 3/223* (2006.01)
*H01S 3/034* (2006.01)
*H01S 3/038* (2006.01)
*H01S 3/07* (2006.01)
(Continued)

(52) U.S. Cl.

CPC ............ *H01S 3/0816* (2013.01); *H01S 3/034* (2013.01); *H01S 3/038* (2013.01); *H01S 3/076* (2013.01); *H01S 3/2232* (2013.01); *H01S 3/0305* (2013.01); *H01S 3/0315* (2013.01); *H01S 3/0818* (2013.01); *H01S 3/08054* (2013.01)

(58) Field of Classification Search

CPC ...... H01S 3/0315; H01S 3/034; H01S 3/0816; H01S 3/0818; H01S 3/076; H01S 3/038; H01S 3/2232; H01S 3/08054; H01S 3/0305

See application file for complete search history.

(56) References Cited

U.S. PATENT DOCUMENTS 3,239,323 A 3/1966 Folweiler
3,950,712 A 4/1976 Chenausky et al.
(Continued)

FOREIGN PATENT DOCUMENTS

EP 1184946 A1 3/2002
JP S5929481 A 2/1984
WO 2002075865 9/2002

OTHER PUBLICATIONS

Extended European Search Report, European Application No. 16154764.1-1556, dated Jun. 16, 2016, 6 pages.

*Primary Examiner* — M. A. Golub-Miller
(74) *Attorney, Agent, or Firm* — Barnes & Thornburg LLP

(57) ABSTRACT

In at least one illustrative embodiment, a laser may include a ceramic body defining a chamber containing a laser gas. The chamber may include first and second slab waveguide sections extending along parallel first and second axes and a third slab waveguide section extending along a perpendicular third axis. Respective first ends of the first and second slab waveguide sections may be positioned adjacent opposite ends of the third slab waveguide section. The laser may also include first and second end mirrors positioned at respective second ends of the first and second slab waveguide sections, a first fold mirror positioned near an intersection of the first and third axes at a 45-degree angle to both the first and third axes, and a second fold mirror positioned near an intersection of the second and third axes at a 45-degree angle to both the second and third axes, such that the first, second, and third slab waveguide sections waveguide recirculating light that is polarized orthogonal to a plane defined by the first, second, and third axes.

11 Claims, 4 Drawing Sheets

(51) Int. Cl.
*H01S 3/03* (2006.01)
*H01S 3/08* (2006.01)

(56) References Cited

U.S. PATENT DOCUMENTS

| | | | |
|---|---|---|---|
| 3,982,204 | A | 9/1976 | Andringa |
| 4,169,251 | A | 9/1979 | Laakmann |
| 4,241,319 | A | 12/1980 | Papayoanou |
| 4,373,202 | A | 2/1983 | Laakmann et al. |
| 4,393,506 | A | 7/1983 | Laakmann et al. |
| 4,455,658 | A | 6/1984 | Sutter |
| 4,493,087 | A | 1/1985 | Laakman et al. |
| 4,596,018 | A | 6/1986 | Gruber et al. |
| 4,662,958 | A | 5/1987 | Conder et al. |
| 4,719,639 | A | 1/1988 | Tulip |
| 4,720,691 | A | 1/1988 | Rammos |
| 4,805,182 | A | 2/1989 | Laakmann |
| 4,837,772 | A | 6/1989 | Laakmann |
| 4,854,987 | A | 8/1989 | Adsett |
| 4,939,738 | A | 7/1990 | Opower |
| 4,982,166 | A | 1/1991 | Morrow |
| 5,004,338 | A | 4/1991 | Morrow |
| 5,008,894 | A | 4/1991 | Laakmann |
| 5,048,048 | A | 9/1991 | Nishimae et al. |
| 5,065,405 | A | 11/1991 | Laakmann et al. |
| 5,155,739 | A | 10/1992 | Mefferd |
| 5,216,689 | A | 6/1993 | Gardner et al. |
| 5,220,577 | A | 6/1993 | Opower |
| 5,386,431 | A | 1/1995 | Tulip |
| 5,412,681 | A | 5/1995 | Eisel et al. |
| 5,409,314 | A | 8/1995 | Laakmann |
| 5,592,504 | A | 1/1997 | Cameron |
| 5,602,865 | A | 2/1997 | Laakmann |
| 5,646,765 | A | 7/1997 | Laakmann et al. |
| 5,661,746 | A | 8/1997 | Sukhman et al. |
| 5,684,820 | A | 11/1997 | Jenkins et al. |
| 5,748,663 | A | 5/1998 | Chenausky |
| 5,754,575 | A | 5/1998 | Sukhman et al. |
| 5,781,579 | A | 7/1998 | Choo et al. |
| 5,805,754 | A | 9/1998 | Zhang |
| 5,822,354 | A | 10/1998 | Vitruk |
| 5,881,087 | A | 3/1999 | Sukhman et al. |
| 5,892,782 | A | 4/1999 | Vitruk et al. |
| 5,953,360 | A | 9/1999 | Vitruk et al. |
| 6,195,379 | B1 | 2/2001 | Jones et al. |
| 6,198,758 | B1 | 3/2001 | Broderick et al. |
| 6,198,759 | B1 | 3/2001 | Broderick et al. |
| 6,370,178 | B1 | 4/2002 | Papayanou et al. |
| 6,442,186 | B1 | 8/2002 | Vitruk |
| 6,599,034 | B2 | 7/2003 | Tatoh et al. |
| 6,603,794 | B2 | 8/2003 | Bethel et al. |
| 6,614,826 | B1 | 9/2003 | Bethel et al. |
| 6,856,639 | B2 | 2/2005 | Dutov et al. |
| 7,460,577 | B2 | 12/2008 | Morrow |
| 7,480,323 | B2 | 1/2009 | Murray |
| 7,570,683 | B1 | 8/2009 | Broderick et al. |
| 8,295,319 | B2 | 10/2012 | Morrow et al. |
| 8,422,528 | B2 | 4/2013 | Morrow et al. |
| 2003/0010420 | A1 | 1/2003 | Morrow |
| 2005/0057640 | A1 | 3/2005 | Clarke et al. |
| 2005/0105581 | A1 | 5/2005 | Seguin et al. |
| 2005/0175054 | A1 | 8/2005 | Shackleton et al. |
| 2006/0029116 | A1 | 2/2006 | Shackleton et al. |
| 2007/0041418 | A1 | 2/2007 | Laughman et al. |
| 2007/0195839 | A1 | 8/2007 | Monty et al. |
| 2008/0101430 | A1 | 5/2008 | Morrow |
| 2008/0123707 | A1 | 5/2008 | Murray |
| 2008/0124433 | A1 | 5/2008 | Yelden et al. |
| 2008/0285607 | A1 | 11/2008 | Murray |
| 2008/0285613 | A1 | 11/2008 | Murray |
| 2009/0213885 | A1 | 8/2009 | DeMaria |

FLAT-FOLDED CERAMIC SLAB LASERS

TECHNICAL FIELD

The present disclosure relates, generally, to lasers and, more specifically, to flat-folded ceramic slab lasers.

BACKGROUND

In waveguide resonators, the resonator walls influence the propagation of a laser beam and shape its mode, to a certain extent. A waveguide resonator may be defined as having a Fresnel number ($N_F=a^2/(\lambda L)$, where a is half of the resonator aperture, λ is the wavelength of the laser beam, and L is the resonator length) that is less than 0.5. One advantage of using a waveguide resonator to form a laser beam is that it allows a decrease in the transverse dimensions of the laser beam inside the waveguide. Smaller transverse dimensions permit an increase in the diffusive cooling efficiency of a laser gas bounded by the waveguide by allowing efficient transportation of waste heat to the walls of the waveguide resonator. With such efficient cooling, the plasma temperature may be lowered, thereby increasing gain, and the pressure of the laser gas may be increased. In sum, waveguide resonators may lead to higher power per volume of laser gas and faster optical response to radio frequency (RF) pulses of pump energy.

"Slab" lasers take advantage of efficient cooling in a waveguide axis of the resonator, while allowing the other axis of the resonator to behave with free-space characteristics. Power can be coupled out of the laser cavity by designing the resonator to be unstable in the free-space direction of the slab waveguide. By way of example, the resonator of the slab laser may take the form of a negative or positive branch unstable resonator (the negative branch design being more popular, for alignment stability reasons). In a negative branch unstable resonator, light is coupled out of the laser cavity by allowing recirculating energy bouncing between mirrors of the resonator to "walk off" an edge of one end mirror.

The power output of a slab laser may be increased by making the slab waveguide wider (along its free-space direction), within limits imposed by the physical structure of the laser and/or by the required quality of the beam to be emitted. The power output of a slab laser may also be increased by making the slab waveguide longer (along the length of the resonator), which may be advantageous when considering the spatial and longitudinal modes. However, simply increasing the length of a laser body may be undesirable in the market and/or prohibitively expensive with a ceramic body.

SUMMARY

The present invention may comprise one or more of the following features and/or one or more of the features recited in the appended claims and/or any combinations thereof.

According to one aspect, a laser may comprise a ceramic body defining a chamber containing a laser gas. The chamber may comprise a first slab waveguide section extending along a first axis, a second slab waveguide section extending along a second axis, and third slab waveguide section extending along a third axis. The first and second axes may be parallel to one another, the third axis may be perpendicular to both the first and second axes, and respective first ends of the first and second slab waveguide sections may be positioned adjacent opposite ends of the third slab waveguide section. The laser may further comprise a first end mirror positioned at a second end of the first slab waveguide section that is opposite the first end of the first slab waveguide section, a second end mirror positioned at a second end of the second slab waveguide section that is opposite the first end of the second slab waveguide section, a first fold mirror positioned near an intersection of the first and third axes at a 45-degree angle to both the first and third axes, and a second fold mirror positioned near an intersection of the second and third axes at a 45-degree angle to both the second and third axes, such that the first, second, and third slab waveguide sections waveguide recirculating light that is polarized orthogonal to a plane defined by the first, second, and third axes.

In some embodiments, each of the first, second, and third slab waveguide sections may exhibit free-space characteristics in the plane defined by the first, second, and third axes. Each of the first, second, and third slab waveguide sections may exhibit waveguide characteristics in a direction perpendicular to the plane defined by the first, second, and third axes. Each of the first, second, and third slab waveguide sections may be partially bounded by ceramic walls of the ceramic body that extend parallel to the plane defined by the first, second, and third axes. The ceramic walls of the ceramic body that extend parallel to the plane defined by the first, second, and third axes may function as waveguides.

In some embodiments, the laser may further comprise a plurality of electrodes positioned outside of the ceramic body, where the plurality of electrodes are configured to excite portions of the laser gas through the ceramic body when an excitation signal is applied to the plurality of electrodes. The plurality of electrodes may be positioned such that only portions of the laser gas in the first and second slab waveguide sections are excited when the excitation signal is applied to the plurality of electrodes. The plurality of electrodes may be positioned such that portions of the laser gas in the third slab waveguide section are not excited when the excitation signal is applied to the plurality of electrodes. The plurality of electrodes may be positioned such that portions of the laser gas between the first and second fold mirrors are not excited when the excitation signal is applied to the plurality of electrodes. The ceramic body and the plurality of electrodes may be supported within an airtight enclosure formed of a non-ceramic material.

In some embodiments, the first and second end mirrors form an unstable negative branch resonator. A focus of the unstable negative branch resonator may be positioned between the first and second fold mirrors. The focus of the unstable negative branch resonator may be positioned at a midpoint between the first and second fold mirrors.

In some embodiments, a radius of a reflective surface of the first end mirror may be smaller than a radius of a reflective surface of the second end mirror. The second slab waveguide section may extend along the second axis a greater distance than the first slab waveguide section extends along the first axis. A first distance between the first end mirror and the first fold mirror may be smaller than a second distance between the second end mirror and the second fold mirror.

In some embodiments, the ceramic body may be formed of a material selected from the group consisting of $Al_2O_3$, BeO, and AlN. The laser gas may be a mixture comprising $CO_2$.

According to another aspect, a laser may comprise a ceramic body defining a chamber containing a laser gas. The chamber may comprise a first slab waveguide section extending along a first axis and a second slab waveguide section extending along a second axis. The first and second slab waveguide sections may each exhibit free-space characteristics in a plane defined by the first and second axes and waveguide characteristics in a direction perpendicular to the plane defined by the first and second axes. The laser may further comprise a fold mirror positioned near an intersection of the first and second axes. A first angle between the first axis and a mirror axis that is perpendicular to a reflective surface of the fold mirror may be greater than 35 degrees and less than 55 degrees, and a second angle between the second axis and the mirror axis may be greater than 35 degrees and less than 55 degrees. As such, the first and second slab waveguide sections are configured to waveguide recirculating light that is polarized orthogonal to the plane defined by the first and second axes.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

DETAILED DESCRIPTION OF THE DRAWINGS

Figure 1:
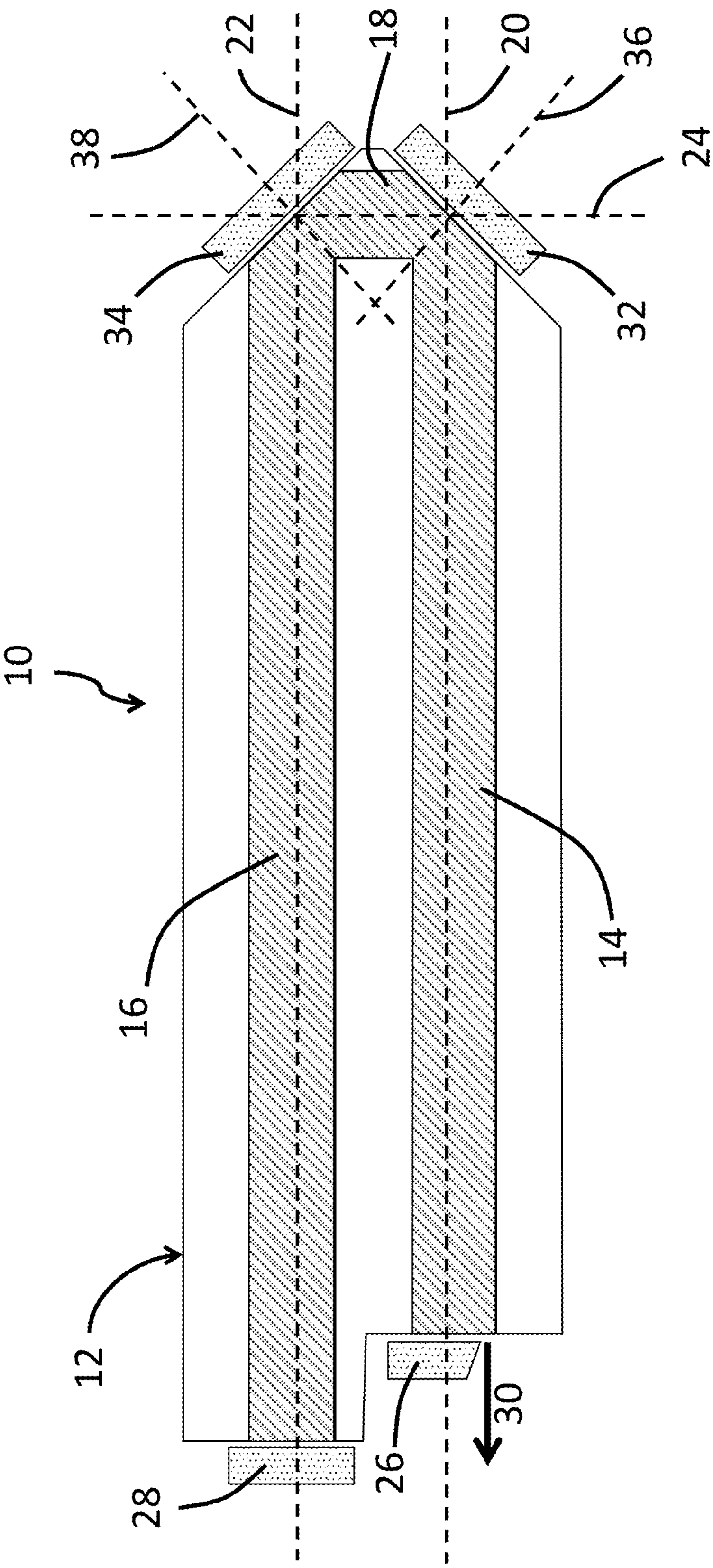
FIG. 1 is a cross-sectional view of one illustrative embodiment of a flat-folded ceramic slab laser.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the present disclosure.

Referring to FIG. 1, one illustrative embodiment of a flat-folded ceramic slab laser 10 is shown in a cross-sectional view. This illustrative embodiment of laser 10 employs two fold mirrors 32, 34, each disposed at 45 degrees to normal incidence, to provide a flat-folded, “U”-shaped resonator. This folding of the resonator increases its length, thereby increasing the power output of the laser 10, without requiring an increase in the overall length of the body of the laser 10. As discussed further below, such flat folding is uniquely made possible by the fact that the laser 10 includes a slab waveguide made of ceramic walls.

In particular, the laser 10 includes a ceramic body 12 defining a chamber containing a laser gas. In the illustrative embodiment, the ceramic body 12 is formed of Aluminum Oxide ($Al_2O_3$, also referred to in the art as “Alumina”). In other embodiments, the ceramic body 12 may be formed of another ceramic material, such as Beryllium Oxide (BeO) or Aluminum Nitride (AlN), by way of example. In still other embodiments, it is contemplated that the body of the laser 10 may be formed of another suitable dielectric material, such as certain types of glass or glass ceramics. In the illustrative embodiment of FIG. 1, the ceramic body 12 is formed as a monolithic ceramic component. In other embodiments, however, the ceramic body 12 may be formed of a plurality of ceramic components. The plurality of ceramic components may be joined together (for example, via brazing, welding, glass fitting, etcetera) or may be supported relative to one another by a non-ceramic enclosure.

In the illustrative embodiment, the laser gas contained in the chamber defined by the ceramic body 12 is a mixture comprising Carbon Dioxide ($CO_2$) as well as other gases. Those of skill in the art will appreciate that, in other embodiments, another suitable gas or mixture of gases may be used in the laser 10. In the illustrative embodiment, the ceramic body 12, together with other components of the laser 10 (e.g., mirror mounts), forms an airtight, or vacuum-sealed, enclosure containing the laser gas. In other embodiments, however, the ceramic body 12 may be contained within another airtight enclosure (e.g., made of a non-ceramic material, such as metal).

As shown in FIG. 1, in the illustrative embodiment of laser 10, the chamber defined by the ceramic body 12 comprises three slab waveguide sections 14, 16, 18. One end of the slab waveguide section 18 is positioned adjacent (and seamlessly connects) to an end of the slab waveguide section 14, while the opposite end of the slab waveguide section 18 is positioned adjacent (and seamlessly connects) to an end of the slab waveguide section 16. The slab waveguide section 14 extends along an axis 20. The slab waveguide section 16 extends along an axis 22. The slab waveguide section 18 extends along an axis 24. In other words, a length dimension of each of the slab waveguide sections 14, 16, 18 runs generally parallel to a respective one of the axes 20, 22, 24. In the illustrative embodiment of FIG. 1, the axes 20, 22 are parallel to one another, while the axis 24 is perpendicular to both of the axes 20, 22, giving the chamber a generally “U”-shaped cross-section. While the illustrative embodiment is depicted as having three slab waveguide sections 14, 16, 18, it is contemplated that the chamber defined by the ceramic body 12 may include any number of slab waveguide sections in other embodiments. Similarly, while the length dimension of each slab waveguide section 14, 16, 18 is depicted as being disposed at 90 degrees to the length dimension of each adjacent slab waveguide section 14, 16, 18 in the illustrative embodiment, it is contemplated that adjacent slab waveguide sections may be disposed at other angles (e.g., 70 degrees to 110 degrees) to one another in other embodiments.

Each of the slab waveguide sections 14, 16, 18 are partially bounded by ceramic walls of the ceramic body 12 that extend parallel to a plane defined by the axes 20, 22, 24 (e.g., the plane of FIG. 1) and that function as waveguides in the slab waveguide sections 14, 16, 18. In other words, the ceramic walls that extend parallel to the plane defined by the axes 20, 22, 24 are spaced apart by a height that is small enough to be considered a waveguide (e.g., having a Fresnel number less than 0.5). Meanwhile, the width of each of the slab waveguide sections 14, 16, 18 is large enough to be considered completely free-space. In the illustrative embodiment, each of the slab waveguide sections 14, 16, 18 have the same height and the same width. It will be appreciated by those of skill in the art that suitable values for the height and the width of the slab waveguide sections 14, 16, 18 in particular embodiments of the laser 10 will be dependent upon various parameters, including the wavelength of the laser beam and the length of the resonator of the laser 10. In any case, each of the slab waveguide sections 14, 16, 18 exhibits waveguide characteristics in a direction perpendicular to the plane defined by the axes 20, 22, 24 and exhibits free-space characteristics in the plane defined by the axes 20, 22, 24. As will be appreciated from the foregoing, each of the slab waveguide sections 14, 16, 18 is arranged in the same plane.

The laser 10 also includes a pair of end mirrors 26, 28 that form a resonator (via reflections by the two fold mirrors 32, 34) in the chamber defined by the ceramic body 12. The end mirror 26 is positioned at an end of the slab waveguide section 14 that is opposite the end of the slab waveguide section 14 adjacent the slab waveguide section 18. Similarly, the end mirror 28 is positioned at an end of the slab waveguide section 16 that is opposite the end of the slab waveguide section 16 adjacent the slab waveguide section 18. As shown in FIG. 1, in the illustrative embodiment of laser 10, a concave radius of a reflective surface of the end mirror 26 is smaller than a concave radius of a reflective surface of the end mirror 28, so that optical power 30 can be coupled out of the resonator in the free-space direction of the slab waveguide. The end mirror 26 may have a sharp edge for this purpose.

As mentioned above, the illustrative embodiment of laser 10 also includes a number of fold mirrors 32, 34, which serve to optically connect the slab waveguide sections 14, 16, 18. The fold mirrors 32, 34 are illustratively embodied as flat mirrors, as shown in FIG. 1, but could alternatively be embodied as slightly convex or concave mirrors in other embodiments. The fold mirror 32 is positioned near an intersection of the axes 20, 24, at a 45-degree angle to both of the axes 20, 24. In other words, an angle between the axis 20 and a mirror axis 36 that is perpendicular to a reflective surface of the fold mirror 32 is 45 degrees, while an angle between the axis 24 and the mirror axis 36 is 45 degrees. Similarly, the fold mirror 34 is positioned near an intersection of the axes 22, 24, at a 45-degree angle to both of the axes 22, 24. In other words, an angle between the axis 22 and a mirror axis 38 that is perpendicular to a reflective surface of the fold mirror 34 is 45 degrees, while an angle between the axis 24 and the mirror axis 38 is 45 degrees. In other embodiments, it is contemplated that each fold mirror may be disposed, relative to each adjacent slab waveguide section, at any angle that is greater than 35 degrees and less than 55 degrees (e.g., the fold mirror 32 might be disposed such that the angle between the axis 36 and either of the axes 20, 24 was greater than 35 degrees and less than 55 degrees).

As noted above, this flat folding of the resonator of the laser 10 is uniquely made possible due to the slab waveguide sections 14, 16, 18 being defined by the ceramic body 12. While some prior art designs have attempted to utilize folding of slab waveguide resonators to achieve compactness of the laser body, these designs typically employ fold mirrors that reflect the cavity flux at near normal angles (generally, less than 15 degrees from normal incidence). At such low angles, the fold mirrors reflect both "S" polarization (S-Pol) and "P" polarization (P-Pol) of the cavity flux nearly equally well. In contrast, fold mirrors used at 45 degrees (from normal incidence) will reflect S-Pol with higher reflectivity than P-Pol. For clarity, when light reflects off a metal surface at an angle greater than 0 degrees (from normal incidence), light waves that have their electric fields oriented in the plane of reflection (i.e., P-Pol) will have greater losses than light waves that have their electric fields oriented perpendicular to the plane of reflection (i.e., S-Pol). This difference in reflectivity is very pronounced at angles around 45 degrees and greater (see FIG. 2). In view of the foregoing, S-Pol reflections are strongly favored by metal (e.g., aluminum-based) waveguides over P-Pol reflections. As such, slab lasers including one or more metal waveguide walls become polarized parallel to the plane of the slab. This polarization requires any cavity folds in such lasers to be either near normal reflections (e.g., using fold mirrors oriented at less than 15 degrees from normal incidence) or orientated in a complex three-dimensional relationship (which creates difficulty in building and cooling the laser).

Figure 2:
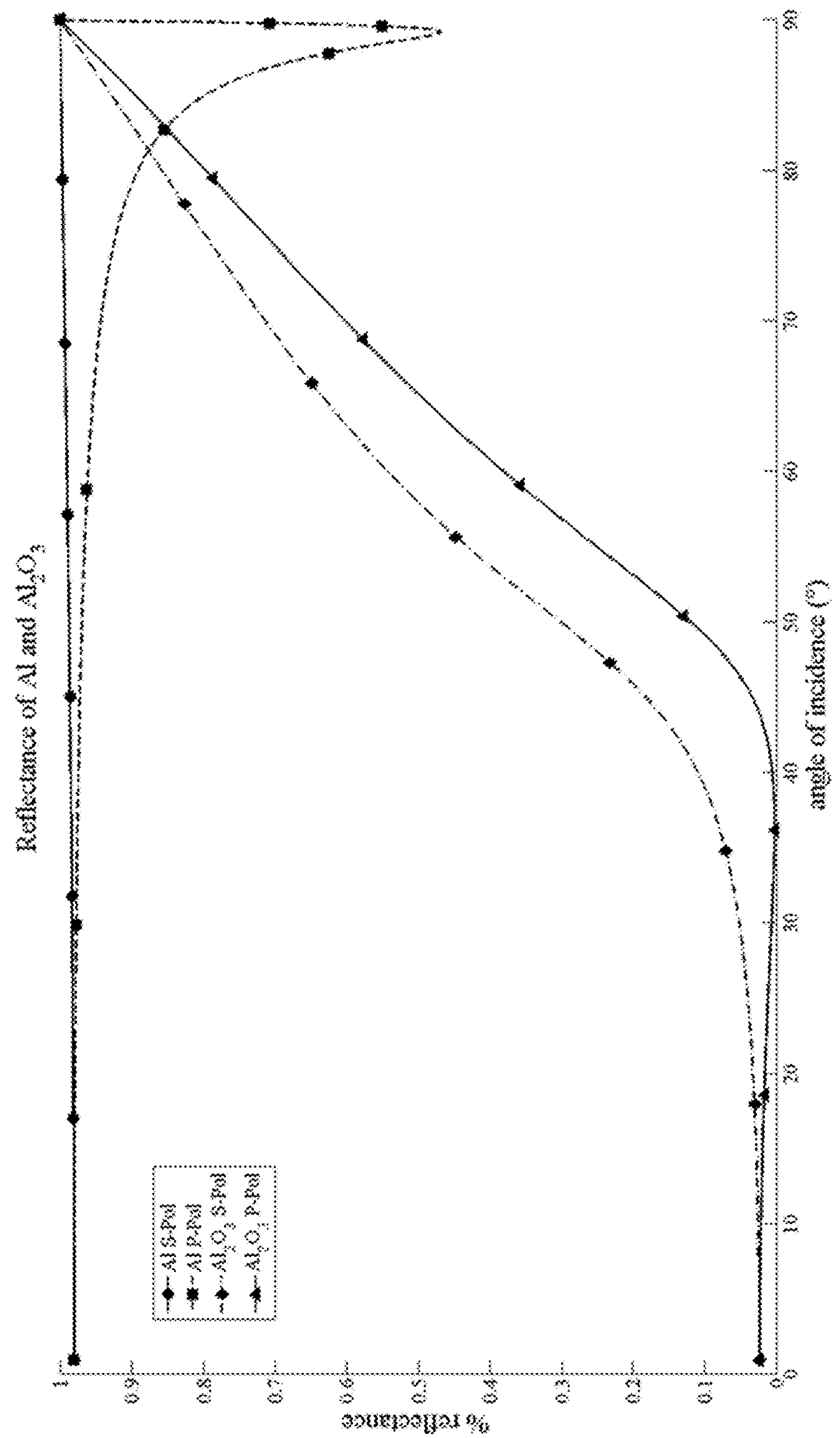
FIG. 2 is a plot of reflection curves comparing the reflectivity of a dielectric ceramic surface (particularly, $Al_2O_3$) and a metal surface (particularly, Al)

In contrast to metal waveguides, dielectric materials (e.g., ceramics) have the ability to waveguide light in either S-Pol or P-Pol with substantially equal efficiency. As such, a slab waveguide in which the waveguide walls are formed from a ceramic material (e.g., $Al_2O_3$) will not prefer one polarization of light relative to another. FIG. 2 illustrates a plot of reflection curves comparing the reflectivity of a ceramic surface (particularly, $Al_2O_3$) and a metal surface (particularly, Al) for both S-Pol and P-Pol. As can be seen in FIG. 2, the S-Pol and P-Pol curves for the ceramic are quite close to each other at high waveguide angles approaching 90 degrees, while the S-Pol and P-Pol curves for the metal are very different as the waveguide angle leaves 90 degrees even slightly. The plots of FIG. 2 demonstrate that a ceramic waveguide surface will not select for polarization while a metal waveguide surface will do so.

As the slab waveguide sections 14, 16, 18 of the laser 10 are defined by the ceramic body 12 (and, thus, waveguide both S-Pol and P-Pol with substantially equal efficiency), the resonator folds of the laser 10 can be kept in the same plane even with the fold mirrors 32, 34 oriented at 45 degrees from each of the axes 20, 22, 24. As discussed above, such an arrangement would not be optically efficient if the slab waveguide included one or more metal waveguide walls. Having the slab waveguide sections 14, 16, 18 oriented in the same plane (as in the illustrative embodiment of laser 10) allows for a simpler resonator structure that is easier to manufacture and easier to cool during operation. Additionally, the S-Pol reflection preference of the fold mirrors 32, 34 oriented at 45 degrees to normal incidence will select the polarization orientation of the cavity. In particular, a laser beam 30 reflected by the fold mirrors 32, 34 will be polarized orthogonal to the plane of the slab waveguide sections 14, 16, 18 (i.e., the plane defined by the axes 20, 22, 24). With the laser beam 30 polarized in this manner, beam mixing of multiple lasers 10 could optionally be achieved using the methods taught in U.S. Pat. No. 4,982,166, the disclosure of which is incorporated herein by reference.

Figure 3:
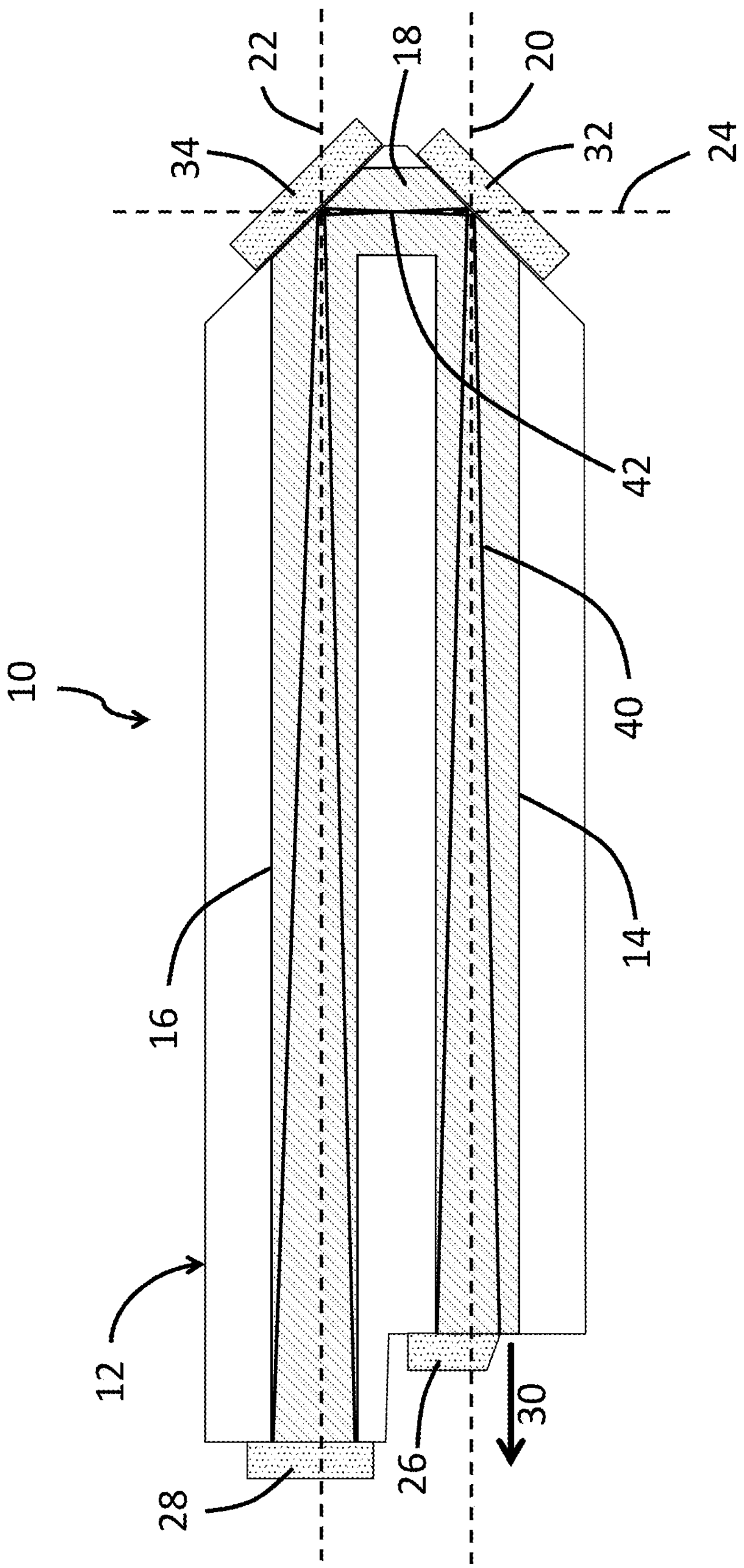
FIG. 3 is a cross-sectional view of the flat-folded ceramic slab laser of FIG. 1, showing one illustrative optical path followed by photons reflecting between mirrors of the laser.

Referring now to FIG. 3, another cross-sectional view of the laser 10, showing one illustrative optical path followed by photons reflecting between the end mirrors 26, 28 (via the fold mirrors 32, 34), is shown. In the illustrative embodiment of FIG. 3, the end mirrors 26, 28 form an unstable negative branch resonator 40. As discussed above, the concave radius of the reflective surface of the end mirror 26 is smaller than the concave radius of the reflective surface of the end mirror 28, so that optical power 30 can be coupled out of the resonator in the free-space direction of the slab waveguide. As shown in FIG. 3, the slab waveguide section 16 extends along the axis 22 a greater distance than the slab waveguide section 14 extends along the axis 20. In other words, a distance between the end mirror 26 and the fold mirror 32 (measured along the axis 20) is smaller than a distance between the end mirror 28 and the fold mirror 34 (measure along the axis 22). These differing distances allow a focus 42 of the unstable negative branch resonator 40 to be positioned between the fold mirrors 32, 34 (as opposed to being positioned at or near one of the fold mirrors 32, 34). Such an arrangement minimizes the flux intensity at the reflective surfaces of the fold mirrors 32, 34 (which may be particularly high at the focus 42), so as to avoid damage to either of the fold mirrors 32, 34. In the illustrative embodiment of FIG. 3, the focus 42 of the unstable negative branch resonator 40 is positioned at a midpoint between the fold mirrors 32, 34 (measured along the axis 24). Such positioning of the focus 42 may be achieved when the ratio between the distance from the end mirror 26 to the fold mirror 32 and the distance from the end mirror 28 to the fold mirror 34 is equal to the ratio between the radii of the reflective surfaces of the end mirrors 26, 28.

Figure 4:
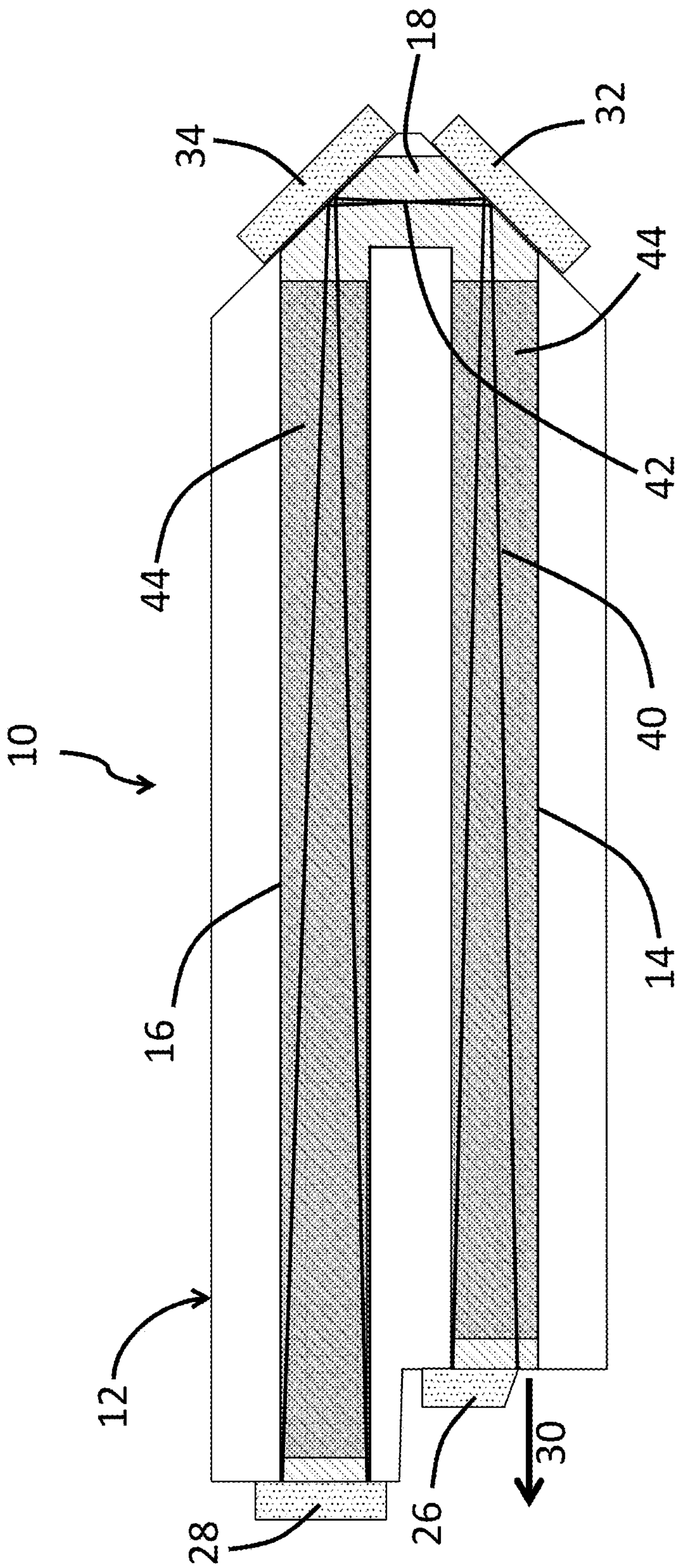
FIG. 4 is a cross-sectional view of the flat-folded ceramic slab laser of FIG. 1, showing one illustrative embodiment of the electrically pumped regions of the laser.

Referring now to FIG. 4, another cross-sectional view of the laser 10, showing one illustrative embodiment of the electrically pumped regions 44 of the laser 10, is shown. The laser 10 further includes a plurality of electrodes (not shown) positioned outside of the ceramic body 12, which are configured to excite portions 44 of the laser gas through the ceramic body 12 when an excitation signal is applied to the electrodes. In the illustrative embodiment shown in FIG. 4, the electrodes of the laser 10 are positioned such that only portions 44 of the laser gas in the slab waveguide sections 14, 16 are excited when the excitation signal is applied to the electrodes. In other words, the electrodes of the laser 10 are positioned such that portions of the laser gas in the slab waveguide section 18 (e.g., portions of the laser gas between the fold mirrors 32, 34) are not excited when the excitation signal is applied to the electrodes. By not wasting pumping energy in the slab waveguide section 18, where half the cavity photons are confined to a relatively small area, the pumping efficiency of the laser 10 may be increased.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present disclosure.

The invention claimed is:

1. A laser comprising:

a ceramic body comprising a set of opposing ceramic walls, the opposing ceramic walls defining a chamber containing a laser gas configured to generate laser light having a wavelength λ, the chamber comprising a first chamber section defined between the opposing ceramic walls and extending along a first axis, a second chamber section defined between the opposing ceramic walls and extending along a second axis, and third chamber section defined between the opposing ceramic walls and extending along a third axis, wherein the first and second axes are parallel to one another, the third axis is perpendicular to both the first and second axes, and respective first ends of the first and second chamber sections are positioned adjacent opposite ends of the third chamber section;

a first end mirror positioned at a second end of the first chamber section that is opposite the first end of the first chamber section;

a second end mirror positioned at a second end of the second chamber section that is opposite the first end of the second chamber section;

a first fold mirror positioned near an intersection of the first and third axes at a 45-degree angle to both the first and third axes; and a second fold mirror positioned near an intersection of the second and third axes at a 45-degree angle to both the second and third axes;

wherein the first and second end mirrors define a resonator length L;

wherein the first, second, and third chamber sections each have (i) a height defined between the opposing ceramic walls and extending perpendicular to a plane defined by the first, second, and third axes, and (ii) a width extending parallel to the plane defined by the first, second, and third axes, wherein the height is less than $\sqrt{2\lambda L}$, and wherein the width is larger than height;

wherein a radius of a reflective surface of the first end mirror is smaller than a radius of a reflective surface of the second end mirror; and wherein the second chamber section extends along the second axis a greater distance than the first chamber section extends along the first axis.

2. The laser of claim 1 wherein each of the first, second, and third chamber sections exhibits free-space characteristics in the plane defined by the first, second, and third axes.

3. The laser of claim 2 wherein each of the first, second, and third chamber sections exhibits waveguide characteristics in the height dimension.

4. The laser of claim 1 wherein the opposing ceramic walls of the ceramic body are configured to function as waveguides for the laser light.

5. The laser of claim 1 wherein the first and second end mirrors form an unstable negative branch resonator.

6. The laser of claim 5 wherein a focus of the unstable negative branch resonator is positioned between the first and second fold mirrors.

7. The laser of claim 6 wherein the focus of the unstable negative branch resonator is positioned at a midpoint between the first and second fold mirrors.

8. The laser of claim 1 wherein the ceramic body is formed of a material selected from the group consisting of $Al_2O_3$, BeO, and AlN.

9. The laser of claim 1 wherein the laser gas is a mixture comprising $CO_2$.

10. The laser of claim 1 wherein the resonator length L is a sum of: (i) a distance between the first end mirror and the first fold mirror, (ii) a distance between first and second fold mirrors, and (iii) a distance between the second end mirror and the second fold mirror.

11. A laser comprising:

a ceramic body comprising a set of opposing ceramic walls, the opposing ceramic walls defining a chamber containing a laser gas configured to generate laser light having a wavelength λ, the chamber comprising a first chamber section defined between the opposing ceramic walls and extending along a first axis, a second chamber section defined between the opposing ceramic walls and extending along a second axis, and third chamber section defined between the opposing ceramic walls and extending along a third axis, wherein the first and second axes are parallel to one another, the third axis is perpendicular to both the first and second axes, and respective first ends of the first and second chamber sections are positioned adjacent opposite ends of the third chamber section;

a first end mirror positioned at a second end of the first chamber section that is opposite the first end of the first chamber section;

a second end mirror positioned at a second end of the second chamber section that is opposite the first end of the second chamber section;

a first fold mirror positioned near an intersection of the first and third axes at a 45-degree angle to both the first and third axes; and a second fold mirror positioned near an intersection of the second and third axes at a 45-degree angle to both the second and third axes;

wherein the first and second end mirrors define a resonator length L;

wherein the first, second, and third chamber sections each have (i) a height defined between the opposing ceramic walls and extending perpendicular to a plane defined by the first, second, and third axes, and (ii) a width extending parallel to the plane defined by the first, second, and third axes, wherein the height is less than $\sqrt{2\lambda L}$, and wherein the width is larger than height;

wherein a radius of a reflective surface of the first end mirror is smaller than a radius of a reflective surface of the second end mirror; and wherein a first distance between the first end mirror and the first fold mirror is smaller than a second distance between the second end mirror and the second fold mirror.

* * * * *